US006699608B2

(12) United States Patent
Blaszczyk et al.

(10) Patent No.: US 6,699,608 B2
(45) Date of Patent: Mar. 2, 2004

(54) METHOD AND APPARATUS FOR HUMIDIFYING A GAS FLOW AND TO A METHOD FOR USING SUCH A DEVICE

(75) Inventors: Janusz Blaszczyk, Richmond (CA); Wolfram Fleck, Coquitlam (CA); Colin Keddie, Burnaby (CA)

(73) Assignee: Ballard Power Systems AG, Kirchheim-Nabern (DE)

( * ) Notice: Subject to any disclaimer, the term of this patent is extended or adjusted under 35 U.S.C. 154(b) by 131 days.

(21) Appl. No.: 09/875,274

(22) Filed: Jun. 7, 2001

(65) Prior Publication Data

US 2002/0086194 A1 Jul. 4, 2002

(30) Foreign Application Priority Data

Jun. 7, 2000 (DE) .......................................... 100 28 133

(51) Int. Cl.[7] ................................................ H01M 8/00
(52) U.S. Cl. ........................... 429/13; 429/14; 429/17; 429/20; 429/26; 165/166; 165/167
(58) Field of Search .............................. 429/13, 14, 17, 429/20, 26; 165/166, 167

(56) References Cited

U.S. PATENT DOCUMENTS 4,973,530 A 11/1990 Vanderborgh et al. ......... 429/13
6,494,169 B1 * 12/2002 Tsubouchi et al. ............ 122/166

FOREIGN PATENT DOCUMENTS

EP    0 629 014 B1    4/1997

* cited by examiner

Primary Examiner—Bruce F. Bell
(74) Attorney, Agent, or Firm—Seed IP Law Group PLLC

(57) ABSTRACT

A method and apparatus for humidifying a gas flow includes means for atomizing a liquid into a gas feed line and means for heating the liquid. The atomizing means is provided in a spray chamber, with a heat-exchanger region for at least partially evaporating the liquid being arranged adjacent to the spray chamber. The heat-exchanger region has a multiplicity of flow passages for gas flows which are to be humidified, which flow passages are at least partially delimited by heat-exchanger surfaces for condensing and evaporating the liquid.

17 Claims, 3 Drawing Sheets

METHOD AND APPARATUS FOR HUMIDIFYING A GAS FLOW AND TO A METHOD FOR USING SUCH A DEVICE

BACKGROUND AND SUMMARY OF THE INVENTION

This application claims the priority of German patent document 100 28 133.8, filed Jun. 7, 2000, the disclosure of which is expressly incorporated by reference herein.

The invention relates to a method and apparatus for humidifying a gas flow and to a method for using such a device.

European patent document EP 0,629,014 B1 discloses a method for humidifying process gas for the operation of fuel cells, in which finely atomized water is sprayed in a predetermined quantity, with the aid of a spray nozzle, from a supply line into a gas feed line of the fuel cell. In this method, a desired amount of water to be supplied is determined as a function of operating parameters, and is metered exactly by means of a control arrangement in such a way that the desired humidity of the process gases is established.

In this case, the water is atomized by means of a spray nozzle so that it can be supplied directly to the gas flow. Owing to the geometry of the gas-carrying passages of the fuel cell, however, the maximum permissible droplet size must be determined so that the droplets cannot block any cross sections in the area of the fuel cell. Thus, the fuel cell system must be specifically adapted to the atomization; and the outlay involved in regulating or determining the desired values for controlling the water metering is also highly complex.

In addition to direct spraying of water into the gas flows, other known devices and methods for humidifying gas flows utilize various types of membranes which separate the gas flow from a liquid flow or a liquid reservoir. The membranes allow liquid particles to enter the gas flow through the membrane and to be picked up and carried along by the gas flow. One example of such systems which can be mentioned is U.S. Pat. No. 4,973,530.

The known devices for humidifying process gases such as air or hydrogen are usually large and heavy. The media generally have to be cooled before they enter the humidifier. On the other hand, if a medium freezes in the humidifier, the humidifier is damaged.

The object of the invention is to provide a method and apparatus which achieve a high humidity or high relative humidity in a gas flow while reducing the outlay in terms of control and the device for humidifying the gas flows, and which are suitable for use at low temperatures.

This and other objects and advantages are achieved by the humidifying method and apparatus according to the invention, which includes means for atomizing a liquid into a gas feed line and means for heating the liquid. The atomizing means is provided in a spray chamber, with a heat-exchanger region for at least partially evaporating the liquid being arranged adjacent to the spray chamber. The heat-exchanger region has a multiplicity of flow passages for gas flows which are to be humidified, which flow passages are at least partially delimited by heat-exchanger surfaces for condensing and evaporating the liquid.

The invention makes it possible to carry out humidification by evaporation at low temperatures through the direct conduction of heat, without complex process controls. A further advantage of the invention is that the medium to be evaporated is very finely and uniformly dispersed in a humidifier, making the evaporation process more efficient. The device can operate both with high-temperature media and, without problems, at the freezing point. The pressure loss in the device is advantageously low.

Other objects, advantages and novel features of the present invention will become apparent from the following detailed description of the invention when considered in conjunction with the accompanying drawings.

DETAILED DESCRIPTION OF THE DRAWINGS

The invention provides a method and apparatus for humidifying a gas flow that are particularly preferable for use in a fuel cell system to humidify process gases. Humidification of this nature is required, for example, for the cathode feed air or also for a medium fed to the anode in order to ensure satisfaction of the water requirements of a membrane of a polymer-electrolyte fuel cell; it is also to humidify a starting material, in order to promote a reforming reaction in order to obtain a hydrogen-containing reformate in a gas-generating system of a fuel cell system. The invention is described below with reference to a preferred fuel cell system, but is not limited to this application.

Figure 1:
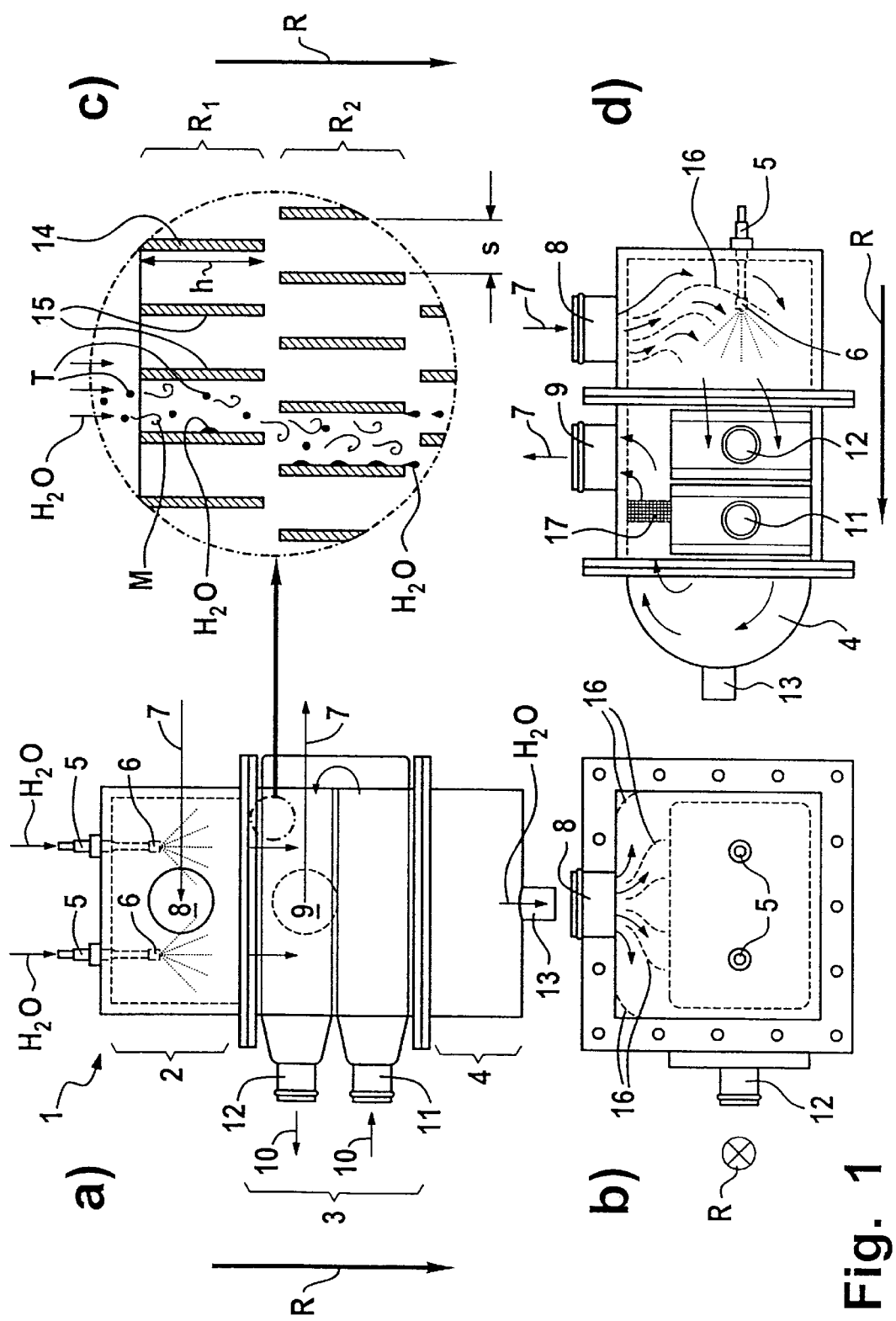
FIGS. 1a–1d show various outline views of a preferred device, FIG. 1a showing the device from the side, FIG. 1b showing the device from above, (i.e., as seen from the water inlet), FIG. 1c showing an enlarged excerpt from the interior of the device to illustrate the evaporation sequence in the interior, and FIG. 1d showing a view of the side of the device, with the feed and discharge ports for the heat-transfer medium.

FIG. 1 shows various outline views of a preferred design of the device according to the invention. In FIG. 1a, the humidifier device 1 comprises three sections, namely a spray chamber 2, a heat-exchanger region 3 and a liquid separator or water separator region 4. However, in contrast to known humidifier devices, heat is transferred directly from a heat-transfer medium to the liquid that is to be evaporated (preferably water), which covers a relatively large surface area of a heat exchanger inside the device.

To achieve a direct transfer of heat, water ($H_2O$) is atomized via means 5, 6 for atomizing a liquid (preferably via one or more feed lines 5, and nozzles 6 in the spray chamber 2) to form a large number of droplets T (FIG. 1c). The atomization preferably takes place in the centre of the spray chamber 2 or as close as possible to the entry to the heat-exchanger region 3, in which the mixing with the flow of the process gas 7 to be humidified also takes place. The spray chamber 2 forms the gas feed line for feeding the process gas 7 into the humidifier device 1. The process gas 7 is fed to the humidifier 1 through a process gas inlet 8 in the region of the spray chamber 2 and is removed from the humidifier 1 through a process-gas outlet 9 in the region of the heat-transfer region 3.

Means 10, 11, 12, 14, 15 for heating the liquid are provided in the heat-exchanger region 3. A heat-transfer medium 10 is supplied via a heat-transfer medium inlet 11 and is removed from the heat-exchanger region 3 via a heat-transfer medium outlet 12. The heat-transfer medium inlet 11 is located downstream of the heat-transfer medium outlet 12 with respect to the direction of flow of the water. In the heat-exchanger region 3, the liquid is at least partially evaporated.

In the region of the water separator 4, excess water is collected and removed through a water outlet 13. In the process, the water moves through the humidifier 1 from the top downwards substantially in a direction of flow R.

Preferably, the liquid or water for humidifying the gas flow is fed into the flow of the process gas. The liquid is supplied in an amount which is greater than that which is theoretically required to achieve a relative humidity of 100%. After a distance in the direction of flow R beyond the supply of liquid, the residual liquid which remains in its liquid phase is separated from the gas stream.

This ensures, in a particularly advantageous way, that this superstoichiometric supply of liquid is able to produce evaporation of the liquid introduced which is as complete as possible. (The energy required for the evaporation is derived from the thermal energy content of the heating medium, the evaporating liquid and the gas.) The result is almost ideal cooling and humidifying of the gas flows. A separation of the residual liquid (i.e., of the liquid droplets remaining in the gas flow) prevents most of the liquid constituents from remaining in the gas flow. Consequently, drops of liquid do not pass into the downstream devices in which they could cause problems.

The heat-exchanger region 3 has a multiplicity of flow passages for the gas flow which is to be humidified. The flow passages are at least partially formed by fins 14 with heat-exchanger surfaces 15 for at least partially condensing and evaporating the liquid.

When the water is atomized, a large number of water droplets T are formed. The droplets T are entrained by the process gas and are conveyed from the spray chamber 2 into the heat-exchanger region 3. A multiplicity of fins 14 are arranged in the heat-exchanger region 3. The surfaces 15 of the fins 14 form heat-exchanger surfaces 15, and split the gas flow into a plurality of parallel flow passages with a direction of flow R.

Figure 2:
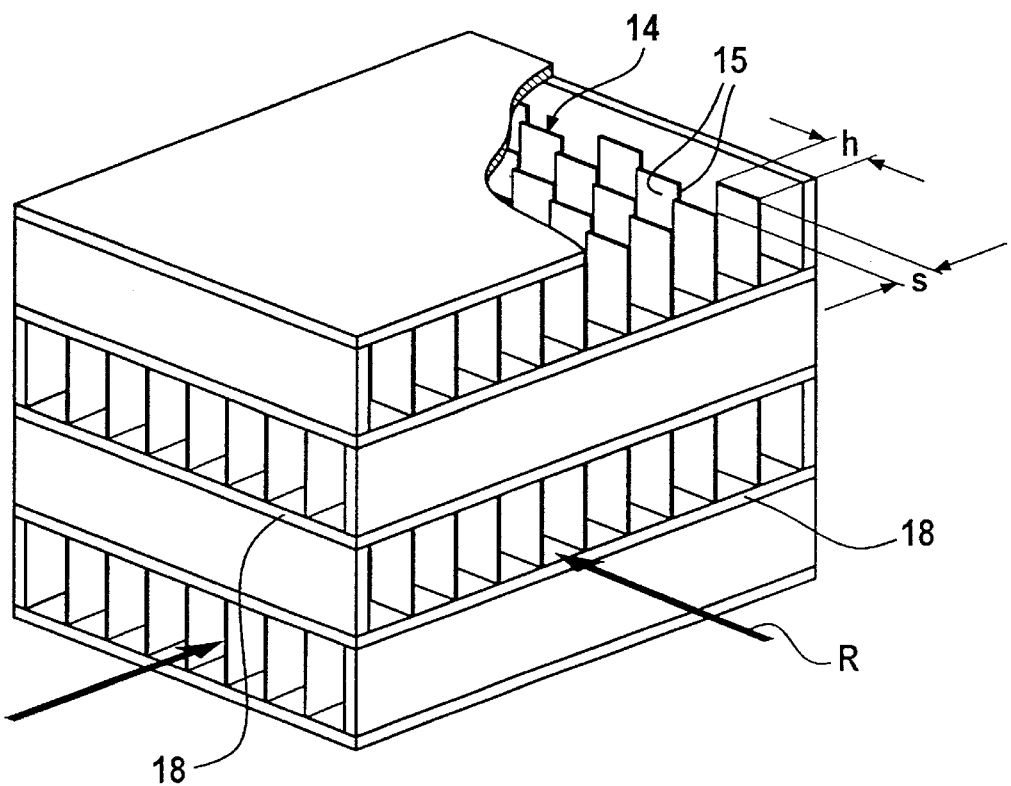
FIG. 2 shows a detail of the heat exchanger with flow passages for the gas flow which is to be humidified and the heating medium.

The fins 14 are heated directly by a heating medium 10 through thermal conduction. This is indicated in FIG. 2 which shows a detail of the heat exchanger region 3. Staggered rows of fins 14 are arranged in one layer. A plurality of such layers are arranged one over the other. A heating medium 10 can flow between the layers. Heat can be transferred by thermal conduction via the fins 14 and the boundaries 18 of the fin layers.

FIG. 1c shows a detailed view of the flow passages between the fins 14 in the heat-exchanger region 3, as an enlarged excerpt from FIG. 1a. For the sake of clarity, only a few fins 14 and surfaces 15 of the fins 14 are provided with a reference numeral. The fins 14 are preferably arranged in a plurality of staggered rows R1, R2, ... which follow one another in the direction of flow of the water and are offset with respect to one another. In each row R1, R2, ..., a multiplicity of fins 14 of a height h are spaced apart at a short distance s. The rows R1, R2, ... which follow one another in the direction of flow R of the water or the droplets T are preferably offset with respect to one another in such a way that fins 14 of a first row R1 lie opposite gaps between fins 14 of an immediately following row R2. The fins 14 produce a very large internal surface area of the heat-exchanger region 3. Instead of fins 14, it is also possible for other types of heat exchanger arrangements to be provided in the heat-exchanger region 3, such as plates, tubes, etc.

For the humidifier 1 to operate optimally, it is expedient for the geometry of the fins 14 and the size of the droplets to be suitably adapted to one another. In a preferred design, a preferred height h of the fins 14 or the rows R1, R2, ... is a few millimeters, preferably 5 mm. A preferred distance s between adjacent fins 14 is less than 1 mm, particularly preferably 0.9 mm. A preferred size for the droplets is approximately 50 $\mu$m.

At least some water droplets T which are entrained in the flow of the process gas 7 in the heat-exchanger region 3 adhere to the surface 15 of the fins 14. Droplets T are entrained by the process gas 7 into the heat-exchanger region 3. When they enter the region of the fins 14, microturbulence M is formed, which enhances the adhesion of droplets T on the surface 15 of the fins 14.

A direct transfer of heat from the fins 14 to the water droplets T takes place on the surface 15 of the fins 14. The temperature difference between water droplets T and heat-transfer medium 10 may be relatively low. The flow-assisted adhesion of the droplets T to the surface 15 allows the heat-transfer medium 10 to act on and supply evaporation energy to the droplets relatively slowly. In this way, it is advantageously possible to evaporate large amounts of water within a short time. Excess water which is not evaporated drops down, in the direction R, into lower areas of the heat-exchanger region 3, where, on coming into contact with the fins surfaces 15, it is either at least partially evaporated or is collected in the water separator 4 below the heat-exchanger region 3.

Additional separation of droplets T from the gas stream 7 can be provided by a coalescing filter 17 upstream the process gas outlet 9.

The amount of water supplied to the spray chamber 2 is expediently sufficiently great to saturate the process gas 7. The amount of water is advantageously a multiple of the minimum amount required, so that there is no need to regulate the supply of water. Excess water is simply trapped in the water separator 4 which adjoins the heat-exchanger region 3.

It will be understood that the water droplets T can be produced using other suitable means, such as for example by atomization by pressure, pneumatic, mechanical or vacuum means, and it is also possible to vary the number of nozzles and the arrangement thereof. To improve compatibility with the process gases which are to be humidified, it is expedient to select a suitable material for the heat-exchanger region, for example corrosion-resistant steels or aluminum alloys, preferably AL-3003, for the humidifying of hydrogen and the like.

In the exit area for the process gas 7, it is advantageous to provide means for removing small droplets T which are remaining in the gas stream 7 and to feed these droplets back to the excess water which has been trapped in the water separator 4. This substantially prevents a fuel cell through which the humidified process gas 7 subsequently flows, from becoming contaminated with impurities trapped in the water droplets. Filters or separators, such as for example cyclone separators, chevron separators, coalescing filters or the like are preferably used for this purpose.

A chevron separator can advantageously fulfil two functions. Firstly, it is suitable for separating out the droplets T of a supercritical size, and secondly it prevents undesirable movement of water in the base region 4 of the humidifier 1.

FIG. 1d illustrates a flow path of the process gas 7 inside the device 1. The flow path runs between the process-gas inlet 8 and process-gas outlet 9, in that the process gas is first passed through the spray chamber 2, then through the heat-exchanger region 3, and thence into the liquid separator 4 to the process-gas outlet 9. At the process-gas outlet 9 a coalescing filter 17 can be installed in order to separate droplets from the gas. At the outlet 9 of the device, the humidified process gas is substantially free of water droplets above a critical size.

The heat-transfer medium 10 used is preferably a medium which, as a coolant, dissipates excess heat from the fuel cell system (not shown). The temperature of such a heat-transfer medium 10 is sufficient for the evaporation in the heat-exchanger region 3. However, if heat-transfer media 10 whose temperature is above the temperatures of such cooling media in the fuel cell system are used, the humidifier 1 can be of smaller design. To achieve this effect, the heat-transfer medium 10 may additionally be heated to a higher temperature by electrical or thermal means.

According to a further advantageous embodiment of the invention the dimensions of the heat-exchanger region 3 are optimized, as a result of means for homogenizing the gas distribution being provided on the gas inlet side 8 for the process gas 7. To achieve this, it is advantageous to provide baffle plates 16 arranged in the spray chamber 2, and influence the flow of the process gas 7 so that the gas flow can be distributed as homogeneously as possible. A further advantageous measure is to optimize the dimensions and arrangement of the heat-transfer medium circuit 11, 12.

It is beneficial for the geometry of the heat-exchanger region 3 to be adapted as accurately as possible to the amount of process gas and the available heat-transfer medium temperatures, so that an optimum ratio of length to width to depth of the heat-transfer region 3 is achieved. It is also advantageous for the distances s, dimensions h and the arrangement of the fins 14 inside the heat-exchanger region 3 to be adapted to one another.

It is advantageous to provide a device for monitoring the water level in the water separator 4.

In known humidifier systems, the heat is released only indirectly to the water which is to be evaporated, since the heat is first emitted to the process gas or to air and is only released to water droplets from these media. Consequently, the transfer of energy is slow and somewhat inefficient. According to the invention, on the other hand, the flow of process gas assists and promotes the adhesion of water droplets T which have adhered to the heat-exchanger surfaces 15 of the heat-exchanger region 3, preferably the fins 14.

Compared to a standard membrane humidifier, use of the humidifier 1 according to the invention results in considerable savings in terms of volume and weight of a humidifier.

For similar conversion levels and quantities of process gas, an optimized humidifier 1 according to the invention is up to 70% smaller and up to 80% lighter than a comparable membrane humidifier. This is advantageous in particular when the humidifier 1 according to the invention is used in mobile fuel cell systems. In addition, considerable costs for expensive membranes are saved if a humidifier 1 according to the invention is used instead of a membrane humidifier; a humidifier 1 according to the invention may be up to 90% cheaper than a membrane humidifier.

A further advantage of the humidifying device according to the invention is that its reliability is improved, since fewer components are required. Moreover, unlike membrane humidifiers, the device can also operate with considerable pressure differences between the heat-transfer medium 10 and the process gas 7. The humidifier 1 according to the invention is substantially free from leaks or is easy to seal and can readily be exposed even to temperatures below the freezing point of water without suffering damage.

Figure 3:
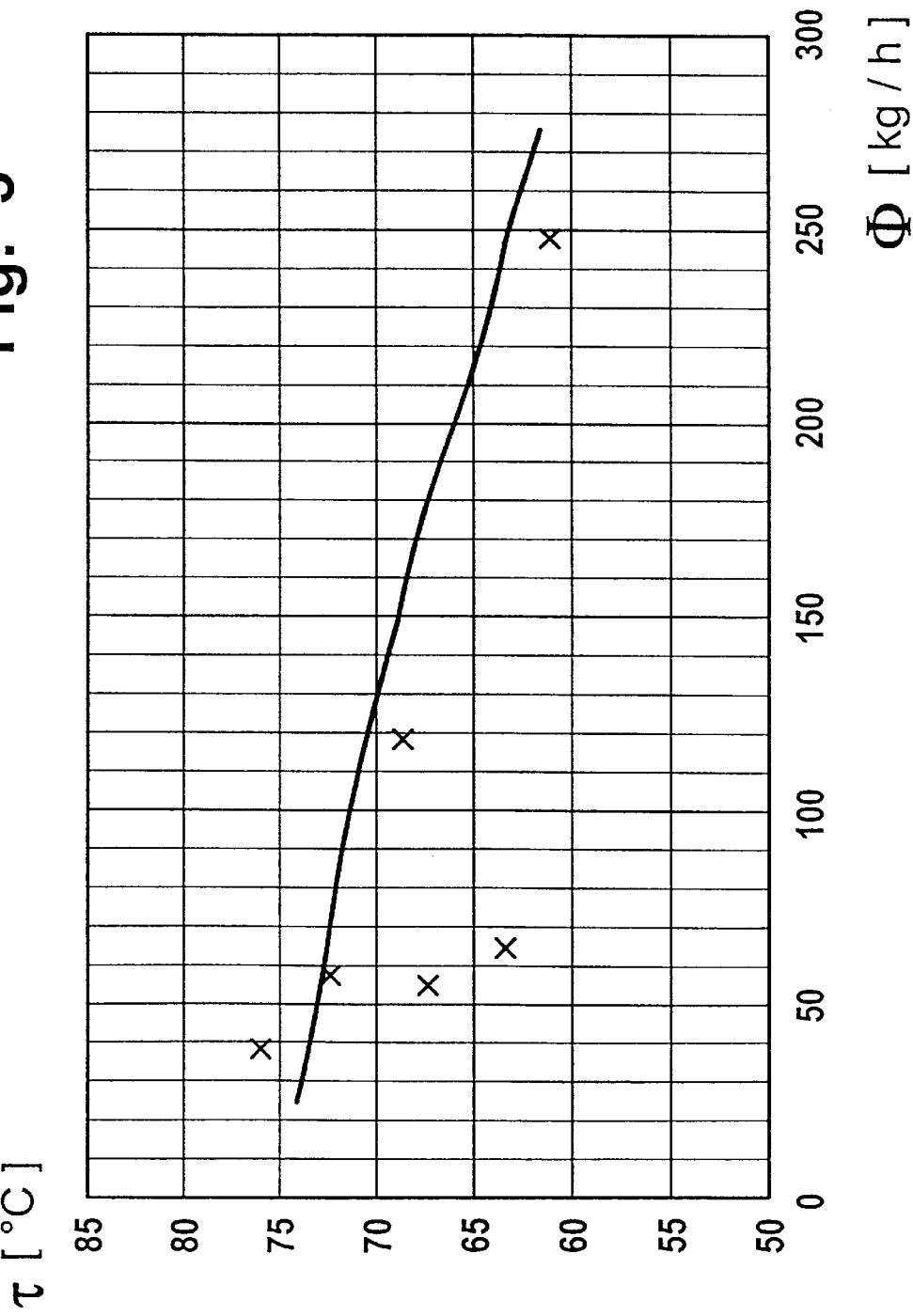
FIG. 3 shows a comparison of measurement data for a preferred humidifier and a known membrane humidifier.

FIG. 3 shows a comparison between the humidifier 1 according to the invention and a membrane humidifier. The dew point $\tau$ of a process gas 7 is plotted as a function of the flow rate $\Phi$ of the process gas 7. The values for the membrane humidifier are represented by the solid line. The points represent measurement data which were measured on a process gas 7 which has been humidified using a humidifier 1 according to the invention. Similar process parameters such as heat-transfer medium temperature, process gas temperature, and process gas pressure were used for both tests. The points are scattered around the continuous curve for the membrane humidifier and demonstrate that a humidifier 1 according to the invention is particularly simple to incorporate in a system which is operated with a standard membrane humidifier. Both humidifier systems can use similar low-temperature heat-transfer media, and the degree of humidification of the process gas is similar.

Water or water containing an antifreeze, preferably a water-glycol mixture, can advantageously be used as the heat-transfer medium 10. The cooling system for the fuel cell system can be of smaller design, since waste heat from the system can be used in the humidifier 1. No further after cooling is required for the humidified process gas 7, since the direct transfer of heat from the heat-transfer medium 10 to the water droplets T means that a heat-transfer medium 10 at a low temperature contributes effectively to the humidification.

No further control arrangements are required for the humidification of a process gas 7, although such arrangements may be provided. The humidifier 1 according to the invention has a number of advantages in particular over standard membrane humidifiers. In theory, based on the same usable volume of a humidifier, it is possible according to the invention to achieve higher dew points $\tau$ than in a membrane humidifier. The pressure drop in the humidifier 1 is lower than in a comparable membrane humidifier. Less heat-transfer medium 10 is required to obtain a process gas 7 with a similar humidity level.

The humidifier 1 according to the invention is particularly suitable for use in fuel cell systems, where humidification at a low process-gas temperature is required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for humidifying a gas flow, comprising means for atomizing a liquid into a gas feed line and means for heating the liquid;
    wherein
        the atomizing means are provided in a spray chamber;
        a heat-exchanger region for at least partially evaporating the liquid is arranged adjacent to the spray chamber;
        the heat-exchanger region has a multiplicity of flow passages for gas flows which are to be humidified; and
        the flow passages are at least partially bounded by heated heat-exchanger surfaces for condensing and evaporating the liquid;

and further comprising:
- a process-gas inlet arranged in the spray chamber; and
- a process-gas outlet arranged in the heat exchanger region.

2. The device according to claim 1, further comprising at least one of a liquid separator and a coalescing filter for removing excess liquid from the device arranged adjacent to the heat-exchange region.

3. The device according to claim 1, wherein a flow path for the process gas between the process-gas inlet and the process-gas outlet runs first through the spray chamber, then through the heat-exchanger region into the liquid separator and, from the liquid separator, back into the heat-exchange region.

4. The device according to claim 1, further comprising distributor means arranged in the spray chamber for influencing a flow of the process gas in the interior of the spray chamber.

5. The device according to claim 1, further comprising:
- a heat-transfer medium inlet in the heat-exchanger region, for supplying a heat-transfer medium; and
- a heat transfer medium outlet;
- wherein the heat-transfer medium inlet is arranged downstream of the heat-transfer medium outlet with respect to a direction of flow of the liquid inside the device.

6. The device according to claim 1, further comprising means situated downstream of the heat-exchange region, for at least partially separating drops of liquid out of the gas flow and/or attenuating or suppressing liquid movements in the liquid separator.

7. The device according to claim 1, wherein the heat-exchanger surfaces are formed at least partially by surfaces of fins.

8. The device according to claim 7, wherein:
- the fins are arranged in at least two rows;
- the fins in each row are arranged parallel to one another; and
- the height of the fins and a distance between adjacent fins in a row are suitable to form microturbulence in the gas flow.

9. The device according to claim 8, wherein rows of fins are arranged offset with respect to one another in the direction of flow, so that fins of one row are positioned opposite gaps between fins in the next row, as seen in the direction of flow.

10. A method for humidifying a gas flow by atomizing liquid and mixing it with a gas flow of a process gas, comprising:
- performing the atomization of the liquid to form droplets and mixing of the droplets with the gas flow in a spray chamber; and
- thereafter passing the process gas/droplet mixture into a heated heat-exchanger region, wherein at least some of the droplets adhere to heat-exchanger surfaces, are evaporated through heat transfer, and are fed to the process gas.

11. The method according to claim 10, wherein turbulence is generated in the gas flow in the heat-exchanger region, so that precipitation and adhesion of droplets on the heat-exchanger surfaces is promoted by the turbulence in the gas flow.

12. The method according to claim 10, wherein:
- the process gas is humidified by passing it via a process-gas inlet into the spray chamber, and then through the heat-exchanger region into one of a water separator and a coalescing filter; and
- process gas is then removed from the device via a process-gas outlet.

13. The method according to claim 12, wherein excess liquid and/or droplets above a critical size are removed form the humidified process gas in one of the water separator and coalescing filter.

14. The method according to claim 10, wherein said process gas is provided to a fuel cell system.

15. A device for humidifying a gas flow, comprising:
- a spray chamber;
- an atomizer for atomizing a liquid in said spray chamber;
- a heat exchanger region arranged adjacent the spray chamber for at least partially evaporating the liquid;
- a multiplicity of flow passages arranged in said heat exchanger region, for accommodating a gas flow that is to be humidified, wherein the flow passages are at least partially bounded by heated heat-exchanger surfaces for condensing and evaporating the liquid;
- a process-gas inlet arranged in the spray chamber; and
- a process-gas outlet arranged in the heat exchanger region.

16. The device according to claim 15, wherein a flow path for the process gas between the process-gas inlet and the process-gas outlet runs first through the spray chamber, then through the heat-exchanger region into the liquid separator and, from the liquid separator, back into the heat-exchanger region.

17. The device according to claim 15, further comprising:
- a heat-transfer medium inlet in the heat-exchanger region, for supplying a heat-transfer medium; and
- wherein the heat-transfer medium inlet is arranged downstream of the heat-transfer medium outlet with respect to a direction of flow of the liquid inside the device.

* * * * *